No. 790,689. PATENTED MAY 23, 1905.
J. D. JUDKINS.
CHEST HANDLE.
APPLICATION FILED APR. 4, 1904.

Witnesses
E. W. Shepherd
R. J. Tune

Inventor
John D. Judkins

By Shepherd Parker
Attorneys

No. 790,689. Patented May 23, 1905.

UNITED STATES PATENT OFFICE.

JOHN D. JUDKINS, OF HARMONY, MAINE.

CHEST-HANDLE.

SPECIFICATION forming part of Letters Patent No. 790,689, dated May 23, 1905.

Application filed April 4, 1904. Serial No. 201,555.

*To all whom it may concern:*

Be it known that I, JOHN D. JUDKINS, a citizen of the United States, residing at Harmony, in the county of Somerset and State of Maine, have invented a certain new and useful Improvement in Chest-Handles, of which the following is a specification.

This invention relates to chest-handles, and has for its objects to provide a handle for chests, trunks, milk-cans, and the like which will be strong, efficient, compact, durable, convenient to use, and which may be cheaply manufactured.

Another object of the invention is to provide a handle which will normally rest flat against the trunk or chest, and is therefore not liable to be broken off.

Another object is to provide a handle which will be protected against accident during transportation and which will remain in its protected position, no matter in what position the supporting chest, trunk, or the like is placed.

A further object of my invention is to provide a handle continuously held under spring tension whereby movement thereof and, when used in connection with milk-cans, objectionable rattling is prevented.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
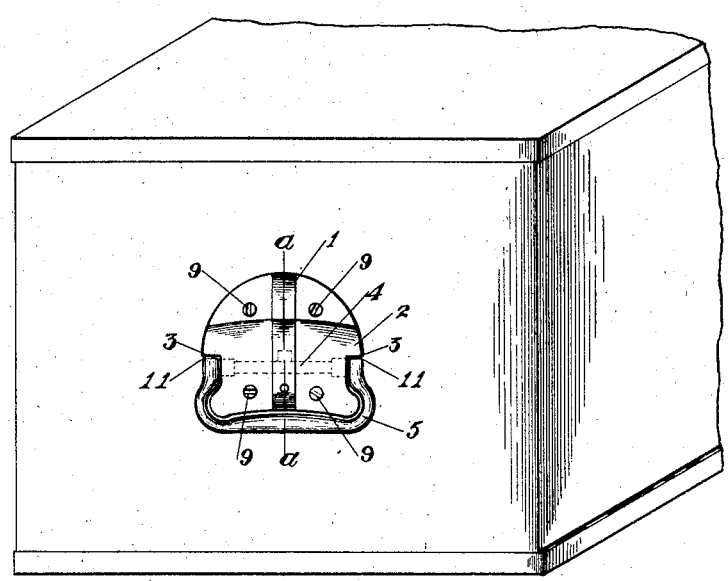
Figure 2:
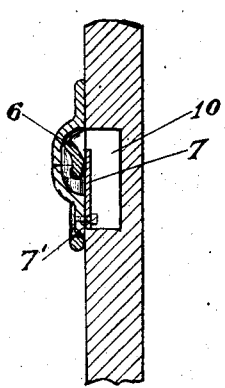
Figure 3:
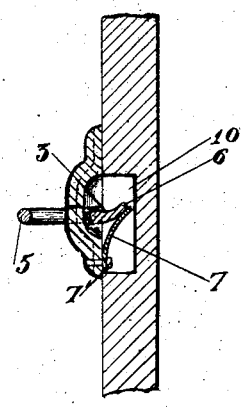

In the drawings, Figure 1 shows in perspective a chest provided with my improved handle. Fig. 2 is a vertical sectional view on the line *a a* of Fig. 1, showing the handle in the position it occupies when not in use, the outstanding guard being omitted. Fig. 3 is a similar sectional view showing the handle in the position it occupies when in use.

Like characters of reference designate corresponding parts in each and every figure of the drawings.

In the preferred embodiment of my invention I employ a metal plate or handle-support 1, provided with an arched central portion 2, having openings 3 at each side thereof, through which pass a pintle or hinge-bar 4, to the ends of which is connected, preferably integral, a grip member or handle whose shape corresponds approximately to that of the lower half of the plate or handle-support 1.

Adjacent to the openings 3 are shoulders 11, against which the sides of the handle 5 abut when the handle is raised.

The openings 3 are open at the back or base of the plate 1, so that the hinge-bar or pintle carried by the handle may be readily placed in position.

On the pintle or hinge-bar, preferably at the center thereof, is located a curved outstanding cam which engages a spring 7, preferably of steel, attached to the back of the plate 1, preferably near the bottom thereof, by a screw 7' or by a rivet or in any other well-known way, as shown in Fig. 3.

The action of the spring 7 on the cam 6 serves to normally hold the handle close to the plate, as shown in Fig. 2.

Extending from the upper part of the supporting-plate 1 to the base of said plate is an outstanding rib or guard 8, which serves the purpose of strengthening the plate 1, protecting it against injury from a blow or forcible contact with other objects and allowing room for the formation of recess $8^a$ in the back thereof to accommodate cam 6 and spring 7.

The handle is attached to the chest, trunk, can, or the like by screws 9 or by rivets or in any other well-known way, a recess being provided under the plate to accommodate the movement of the cam 6 and the spring 7.

It will thus be seen that I have provided an exceedingly cheap, efficient, and durable handle which is normally held in a closed position by a spring in constant engagement therewith and is protected from injury by an outstanding guard or brace, which also serves to strengthen the handle-support.

Having thus described my invention, what I claim, and desire to secure by Letters Patent, is—

1. In an article of the character described, a plate having an arched portion, handles pivotally connected therewith and a vertically-disposed hollow rib or guard extending outward from said arched portion and serving to strengthen the same and afford protection for a cam operating therein and attached to the handle.

2. A device of the character described, consisting of a supporting-plate having an arched central portion provided with an outstanding rib, a hinge-bar pivotally mounted in said arched portion, a handle carried by said hinge-bar conforming approximately in shape to the edge of the lower portion of the supporting-plate and normally disposed about the lower portion of said plate in the plane thereof, a cam carried by said hinge-bar and extending away from the handle and in approximately the plane of the hinge-bar and handle, a spring engaging said cam and adapted to return and hold the handle in a closed position.

JOHN D. JUDKINS.

In presence of—
    CHAS. C. MCLAUGHLIN,
    ERROL B. REED.